D. EDGE.

Bee Hive.

No. 83,479.

Patented Oct. 27, 1868.

WITNESSES:
P. T. Dodge
L. Hailer

INVENTOR.
Duncan Edge
per Dodge & Munn
Attorneys

United States Patent Office.

DUNCAN EDGE, OF ST. MARY'S, ILLINOIS.

Letters Patent No. 83,479, dated October 27, 1868.

IMPROVEMENT IN BEE-HIVES.

The Schedule referred to in these Letters Patent and making part of the same.

*To all whom it may concern:*

Be it known that I, DUNCAN EDGE, of the town of St. Mary's, in the county of Hancock, and State of Illinois, have invented a certain new and useful Bee-Hive; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of a bee-hive, having a central chamber, with removable boxes on each side, with slides for closing the openings, and all arranged as hereinafter described.

Figure 2:
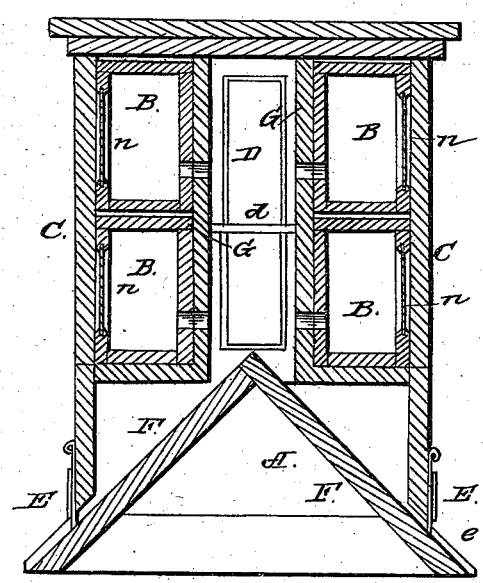
Figure 2 is a transverse vertical section of the same.

In constructing my improved hive, I make a rectangular box, having a double inclined bottom, F, the apex of which is at the centre, as shown in fig. 2, there being a small opening left on two sides, where the sides of the box come down over the bottom, the other two sides extending entirely down to the bottom.

Figure 1:
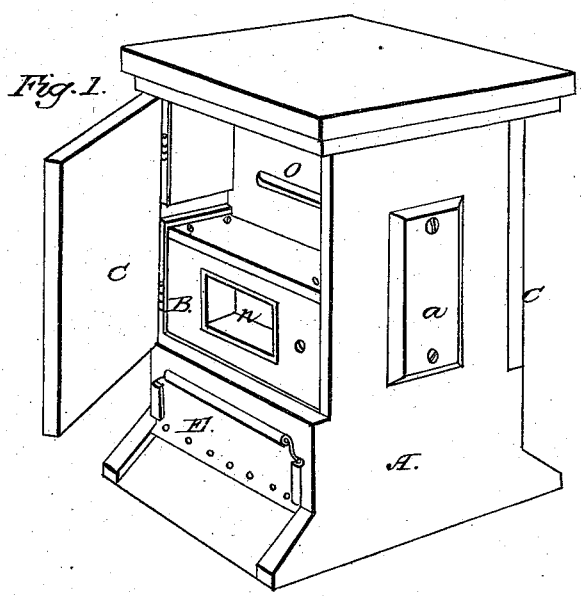
Figure 1 is a perspective view of the hive, with one of the boxes removed.

This box or body of the hive I then divide, by partitions G, into three separate compartments, the two outer ones having removable boxes or drawers B fitted in them, there being a door, C, formed in the outside walls, covering the entire space occupied by the drawers on each side, so that, by opening these doors, the drawers can be removed, as shown in fig. 1, where the drawing represents the upper drawer as being absent.

A long slot is formed on the inside wall of each drawer, which corresponds with a similar slot, O, made in the partitions F, to admit of the passage of the bees from the central chamber into the drawers B, as represented.

Each of the drawers has a light of glass, n, inserted in its front, so that, when the doors C are opened, their interior can be examined at pleasure.

The central chamber, which extends from side to side of the box or hive in one direction, has a glass, D, at one end, covered by a door on the outside, and at the opposite end there is an opening, covered by a removable piece, a, so that, when it is desired to examine the interior of the central chamber, it is only necessary to open the door and look through the glass, D, at the end, and, when it is desired to remove the contents of the chamber, it can be readily effected by removing the piece a.

The chamber has cross-bars, d, extending across it, to support the comb, the same as in the ordinary hives.

At each of the openings e at the base of the hives, I secure a perforated slide, E, which are so arranged that they can be closed or opened at pleasure, either to exclude the moths or robber-bees, or to confine the bees in the hive, when necessary, as is sometimes the case.

In a hive thus constructed, the comb containing the brood will be invariably built in the central chamber, and whenever the bees furnish a surplus of honey, it will be stored in the drawers B, which can be removed and replaced at pleasure, and without at all disturbing the bees in the central chamber.

By closing the slides E at night, the moths will be excluded, the hive being ventilated or supplied with fresh air through the perforations in the slides.

The inclined sides of the bottom, F, will cause all refuse matter to roll down and out of the hive, and thus keep it clean.

By these means, I produce a hive that is admirably adapted to the habits and wants of the bees, and that admits of ready access to all its parts, as circumstances may require.

Having thus described my invention,
What I claim is—

A bee-hive, having the stationary central chamber, with the glass, D, at one end, and the removable piece a at the opposite end, with the drawers B, and doors C, arranged on opposite sides thereof, all constructed as described.

DUNCAN EDGE.

Witnesses:
THOMAS BRUMBACK,
JACOB CASTLEBURY.